United States Patent
Montalvo Muniz (10) Patent No.: US 12,421,998 B2
(45) Date of Patent: Sep. 23, 2025

(54) ADJUSTABLE ANTI-VIBRATION RUBBER ASSEMBLY FOR A CARDAN SHAFT

(71) Applicant: Fidel Alvarez Venegas, Cuautitlan Izcalli (MX)

(72) Inventor: Ruben Gregorio Montalvo Muniz, Cuautitlan Izcalli (MX)

(73) Assignee: Fidel Alvarez Venegas, Cuautitlan Izcalli (MX)

( * ) Notice: Subject to any disclaimer, the term of this patent is extended or adjusted under 35 U.S.C. 154(b) by 211 days.

(21) Appl. No.: 18/471,999

(22) Filed: Sep. 21, 2023

(65) Prior Publication Data
US 2024/0093725 A1    Mar. 21, 2024

(30) Foreign Application Priority Data
Sep. 21, 2022   (MX) .................... MX/a/2022/011714

(51) Int. Cl.
- *F16C 19/06* (2006.01)
- *B60K 17/24* (2006.01)
- *F16C 27/06* (2006.01)
- *F16C 35/04* (2006.01)

(52) U.S. Cl.
CPC ............ *F16C 27/066* (2013.01); *B60K 17/24* (2013.01); *F16C 19/06* (2013.01); *F16C 35/047* (2013.01); *F16C 2326/06* (2013.01)

(58) Field of Classification Search
CPC ...... F16C 19/06; F16C 27/066; F16C 35/047; F16C 2326/06; B60K 17/24
See application file for complete search history.

(56) References Cited

U.S. PATENT DOCUMENTS

| | | |
|---|---|---|
| 2,397,164 A | 3/1946 | Shafer |
| 2,439,269 A | 4/1948 | Shafer |
| 3,390,854 A | 7/1968 | Sherburne |
| 5,172,985 A | 12/1992 | Constancio |
| 7,534,048 B2 | 5/2009 | Holman |
| 8,070,365 B2 | 12/2011 | Hoppert |
| 8,646,566 B1 | 2/2014 | Bouzit et al. |
| 9,677,605 B2 | 6/2017 | Cheon |
| 11,098,757 B2 | 8/2021 | Holman et al. |
| 2022/0041054 A1 | 2/2022 | Davazli |

FOREIGN PATENT DOCUMENTS

| | | | |
|---|---|---|---|
| CN | 201291764 Y | 8/2009 | |
| CN | 203331830 U | 12/2013 | |
| CN | 103879281 A | 6/2014 | |
| CN | 105751894 A | 7/2016 | |
| CN | 205651969 U | 10/2016 | |
| CN | 211195863 U | 8/2020 | |
| CN | 113733903 A | 12/2021 | |
| DE | 102006018904 A1 * | 11/2006 | ............. B60K 17/24 |
| KR | 20130065102 A | 6/2013 | |
| KR | 20180007210 A | 1/2018 | |

* cited by examiner

*Primary Examiner* — Phillip A Johnson
(74) *Attorney, Agent, or Firm* — Patenting Consulting Group; Roberto J Rios (57) ABSTRACT

An adjustable anti-vibration rubber assembly for the cardan shaft. The assembly includes radial bases (4) and tightening plates (5) that adjust the functionality of a metal frame (3) of an assembly.

20 Claims, 7 Drawing Sheets

ADJUSTABLE ANTI-VIBRATION RUBBER ASSEMBLY FOR A CARDAN SHAFT

FIELD OF THE INVENTION

The invention relates to the automotive sector and is aimed at cargo units. More specifically relates to improving the assembly operation of the cardan shaft, which is one of the most important components of the drivetrain, along with the engine, clutch, transmission, drive axles, shafts, semi-axis, and wheel assembly.

BACKGROUND OF THE INVENTION

The cardan shaft assembly transfers power from the engine to the drive axles of a unit through the transmission. It transmits torque across various speed ranges and different angles, compensating for changes in the length of the shaft.

Regarding the information above, the function and technical characteristics of the components involved in the operation of the cardan shaft are as follows:

Torque: The entire cardan shaft must be robust enough to transmit the torsional force from the transmission to the drive axle.

Speed: The correct size of the entire cardan shaft must be sufficient to avoid abrupt movements during high-speed operation.

Angles: The entire cardan shaft must be capable of compensating for changes in the operating angle during suspension movement.

Length: The entire cardan shaft must be capable of compensating for changes in length during suspension movement.

During the operation of the entire cardan shaft, the driving pinion seeks to engage with the crown, which resists and the pinion "tries to roll or slide around the crown". When the vehicle starts moving, the yoke (11) is raised, and the vehicle support is pushed downward.

In the case of a mechanical suspension, the driving forces are transmitted from the rear wheels to the front part of the rear springs.

On the other hand, in the case of pneumatic suspensions, the driving force is transmitted from the rear wheels to the Torsion Bars.

According to the present invention, the assembly of an entire cardan shaft comprises the following components:

Universal Joints (U-Joints): Their function allows the cardan shaft to have vertical movement during the normal operation of the vehicle, connecting two yokes. This is required in any vehicle where the operation of two axles is necessary, rotating through a fixed or variable angle.

End Yokes: These provide a connection between the transmission and the drive axles actuated through the universal joints.

Tube: These are part of the different yokes for establishing connections between them, except for the end yokes.

Slip Yokes: These provide the complete propeller shaft assembly with the ability to adjust its length during operation.

Fixed Yokes: These are connections within the same cardan shaft.

Shaft Yoke: Similar to the aforementioned yokes, these provide connections within the same cardan shaft.

Adjustable Anti-Vibration Rubber Assembly for Cardan Shaft: This component serves the purpose of supporting the cardan shaft, absorbing the deformation angles that the cardan shaft exhibits during the operation of the unit.

Depending on the length and extent of work required by the vehicle, the cardan shafts can work in series, each supported by its corresponding adjustable anti-vibration rubber assembly for cardan shaft. This results in working angles, such as:

Universal joint cross operating angle: This angle is formed between the driving member and the cardan shaft.

Furthermore, the angle can be:

Single-Plane angle: Its main characteristic is that it comprises of the total slope of the driveline confined to a single plane. It is typically identified as the vertical plane from a lateral side of the cardan shaft.

Compound angles: These are generated when the assembly consists of an angle in two planes (upper and lateral).

Universal joint cross working angle (JWA): When two yokes intersect at a universal joint cross, the angle formed is called the "Universal Joint Working Angle"

Based on the interaction between the various angles, the following operations are generated:

Phase adjustment: This involves aligning the securing components integrated into the yokes in a cardan shaft.

Inertial excitation: This is due to the destructive forces created by the mass of an object when it is distributed or positioned away from its axis of rotation. The closer the mass is to its axis of rotation; the less inertial excitation occurs.

Torsional excitation: This is due to the destructive forces created by the non-cancellation of angles between two universal joints cross on a cardan shaft.

SUMMARY OF THE INVENTION

The invention is generally directed to an adjustable anti-vibration rubber assembly for a cardan shaft, which operates by supporting the weight of the cardan shaft and absorbing the deformation angles that the cardan shaft exhibits during vehicle operation.

Specifically, the invention relates to a self-aligning action mechanism that enhances the installation process and functionality of the adjustable anti-vibration rubber assembly for a cardan shaft in the vehicle unit, preventing excessive stresses on the bearing flexible rubber support (1) of the adjustable anti-vibration rubber assembly for cardan a shaft due to its installation.

This mechanism allows the vehicle to transmit the required revolutions per minute (RPM) to achieve the necessary speed, while avoiding vibrations that could harm the transmission system by supporting torque when the vehicle is under load.

As previously explained, this invention improves the self-aligning system through the adjustable anti-vibration rubber assembly for a cardan shaft (100). It is implemented as a complement to the metal frame (3) using parallel guides aligned to the installation bores of the metal frame onto the installation surface of the support (9). From its installation, it provides the necessary alignment for the operating angle of the cardan shaft, facilitating a straightforward installation process, eliminating the need for adjustments after installation, and reducing excessive stresses on the bearing flexible rubber support (1) of the adjustable anti-vibration rubber assembly for a cardan shaft.

BRIEF DESCRIPTION OF THE DRAWINGS

Further features and advantages of the invention will become apparent from the following detailed description taken in conjunction with the accompanying figure showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Figure 1:
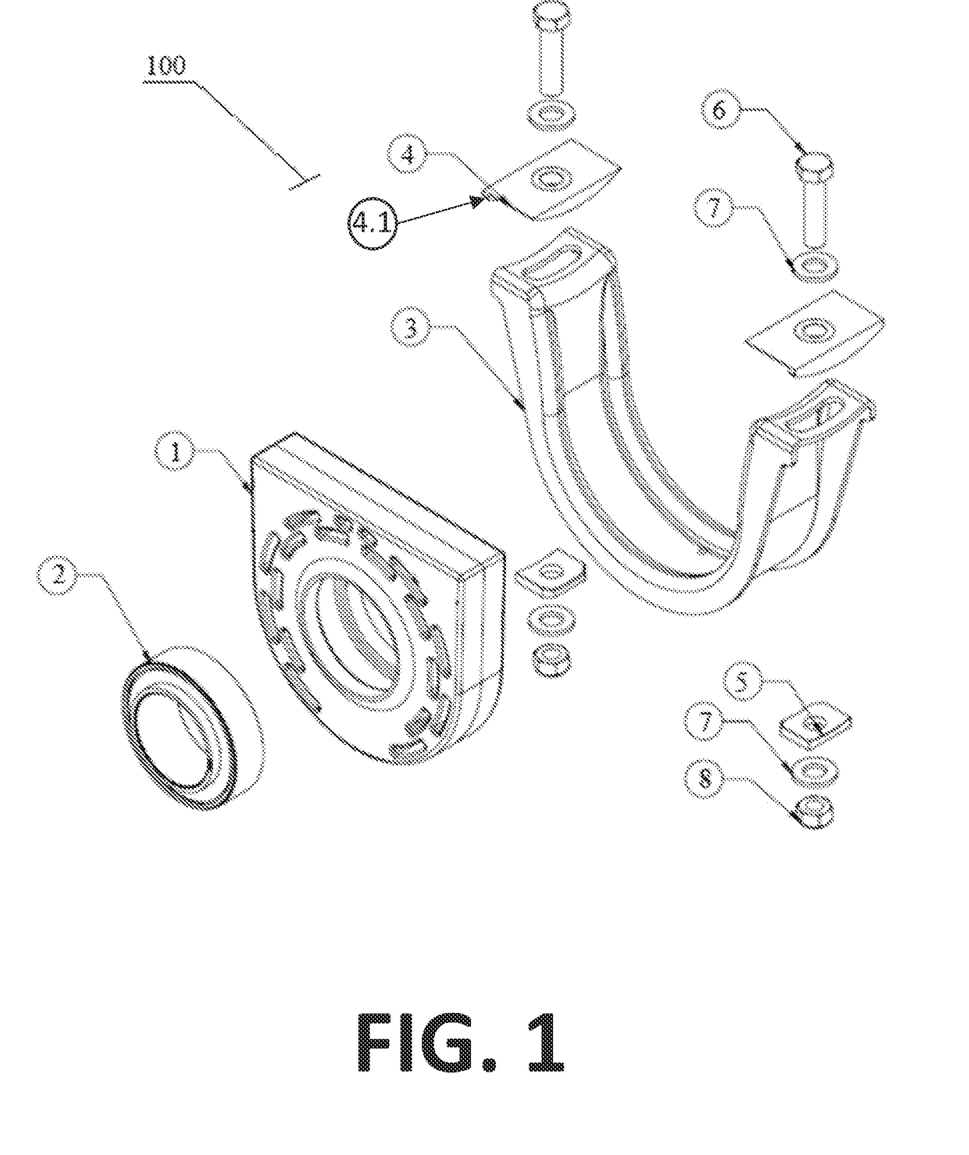
FIG. 1 shows an exploded perspective view of the assembly of the adjustable anti-vibration rubber assembly for a cardan shaft (100), identifying its components and their respective placement.

FIG. 1 illustrates the various components according to the present invention that improve the product installation as it solves the issue of previous solutions where the upper part of the metal frame (3) is flat and parallel to the installation surface of the vehicle's support (9). This previous solution prevented adjustment during installation, causing that any adjustment of the working angle of the adjustable anti-vibration rubber assembly for the cardan shaft be absorbed by the bearing flexible rubber support (1). This resulted in excessive deformation stress due to the load, prior to the vehicle's operation. Thus, an advantage of the present invention is reflected prior to the usual operation of the adjustable anti-vibration rubber assembly for a cardan shaft. In this embodiment, the metal frame (3) has upper ends provided with a concave surface that mates with respective convex surfaces provided on radial bases (4).

Figure 2:
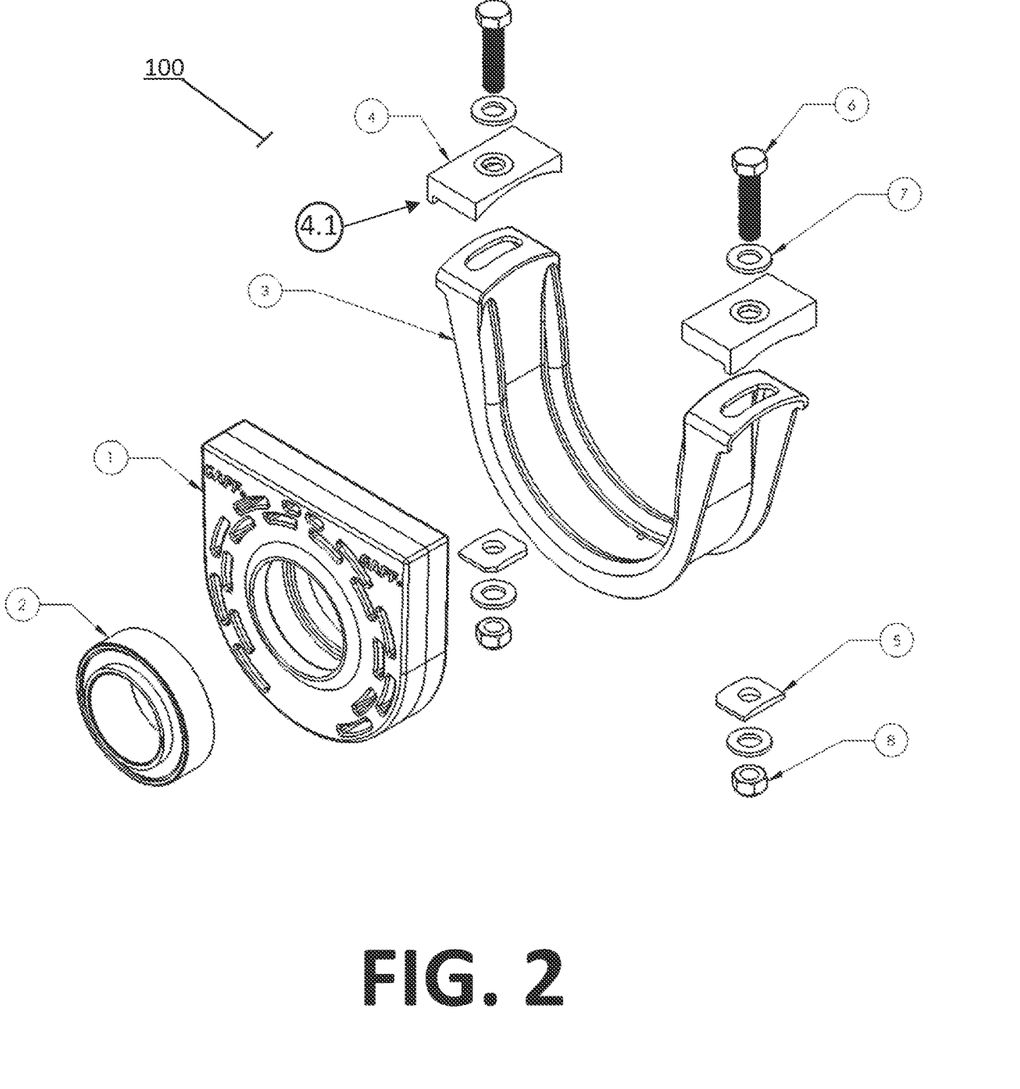
FIG. 2 shows another exploded perspective view of the assembly of the adjustable anti-vibration rubber assembly for a cardan shaft (100), identifying its components and their respective placement, according to another embodiment of the invention.

FIG. 2 illustrates another embodiment similar to the adjustable anti-vibration rubber assembly for a cardan shaft of FIG. 1, where alternatively the metal frame (3) has upper ends provided with a convex surface that mates with respective concave surfaces provided on radial bases (4).

Figure 3:
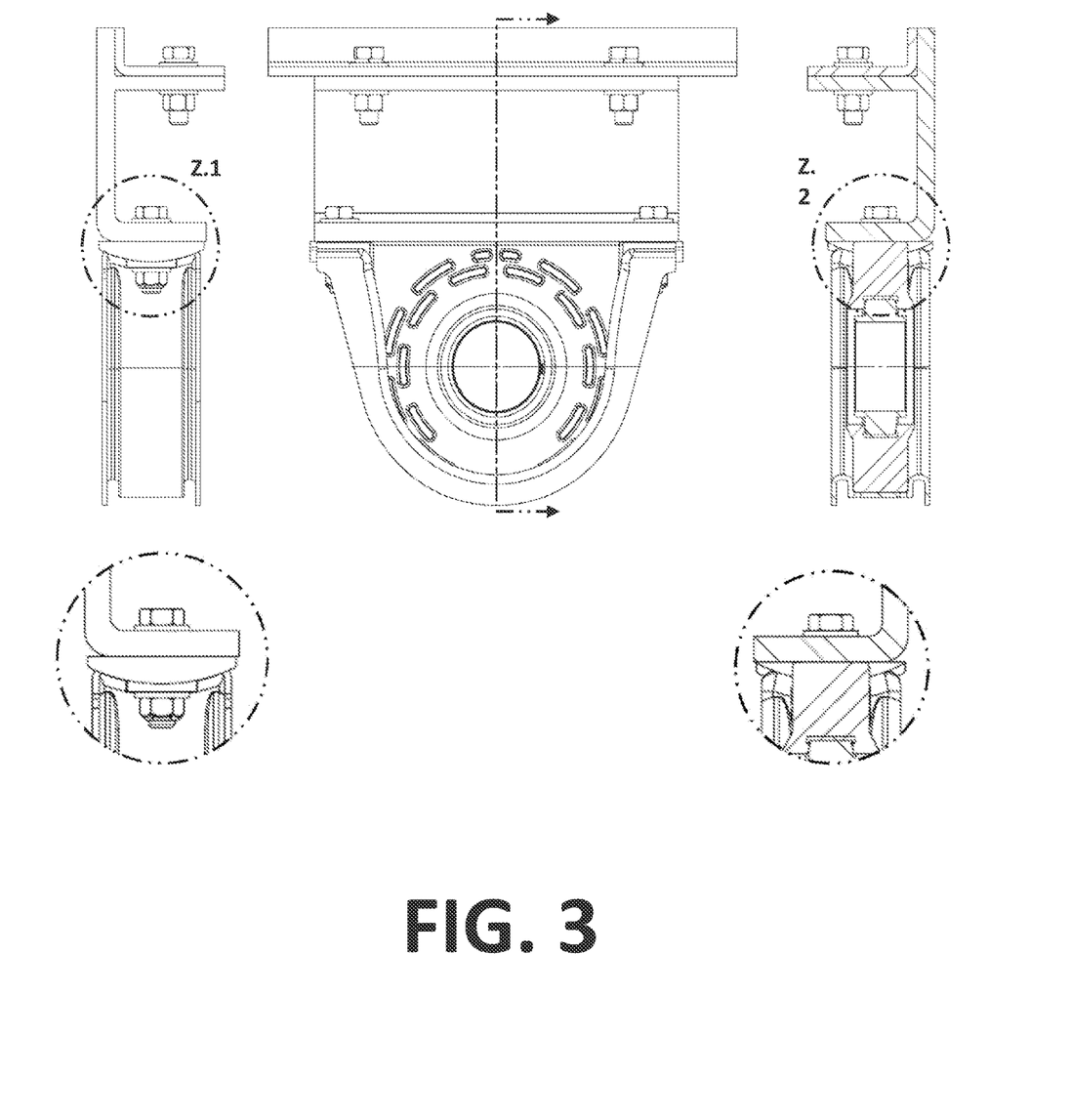
FIG. 3 shows side and side cross-sectional views of the adjustable anti-vibration rubber assembly for a cardan shaft, as well as respective enlarged views of the radial bases (4) of the adjustable anti-vibration rubber assembly for a cardan shaft, where the coupling geometry between them which enables the self-aligning function is demonstrated.
Figure 4:
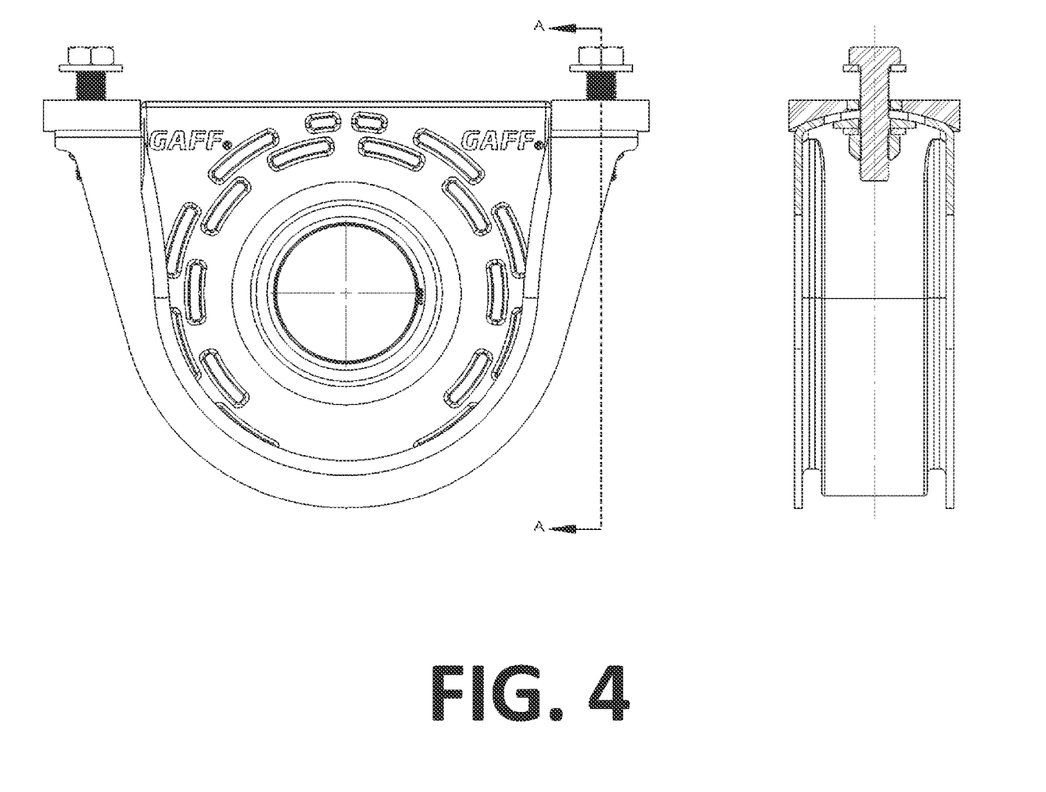
FIG. 4 shows a side cross-sectional view of the adjustable anti-vibration rubber assembly for a cardan shaft, where the coupling geometry between them which enables the self-aligning function is demonstrated, according to another embodiment of the invention.

On the other hand, FIG. 3 illustrates the advantage of simplifying the installation process due to the arrangement of the upper part of the metal frame (3) and the radial bases (4) of the present invention. This arrangement allows to easily adjust the operating angle required by the cardan shaft (10) while also enabling the torque position in the same manner as previous solutions with the base of the metal frame (3) parallel to the installation surface of the support (9). This advantage is also obtained with the alternate arrangement of concave/convex surfaces as shown in FIG. 4 and FIG. 2.

Figure 5:
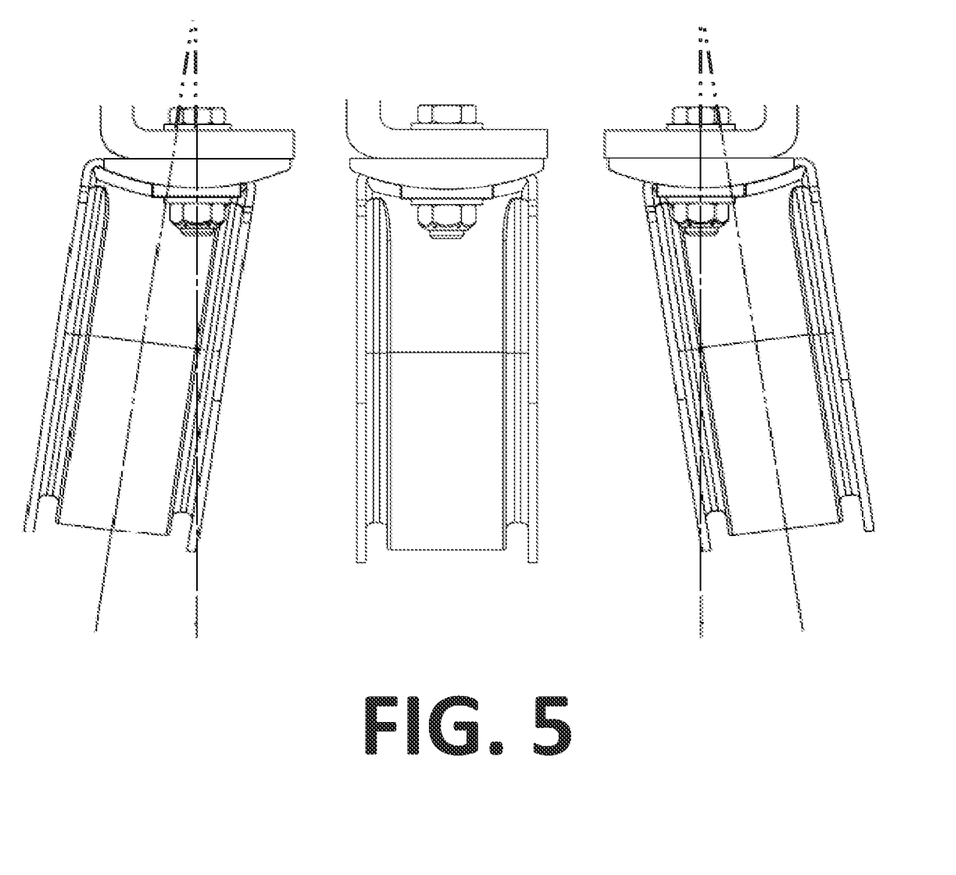
FIG. 5 illustrates the adjustable anti-vibration rubber assembly for a cardan shaft as pre-assembled on the vehicle's support (9), displaying the angles that can be obtained before the final installation adjustment torque is applied.
Figure 6:
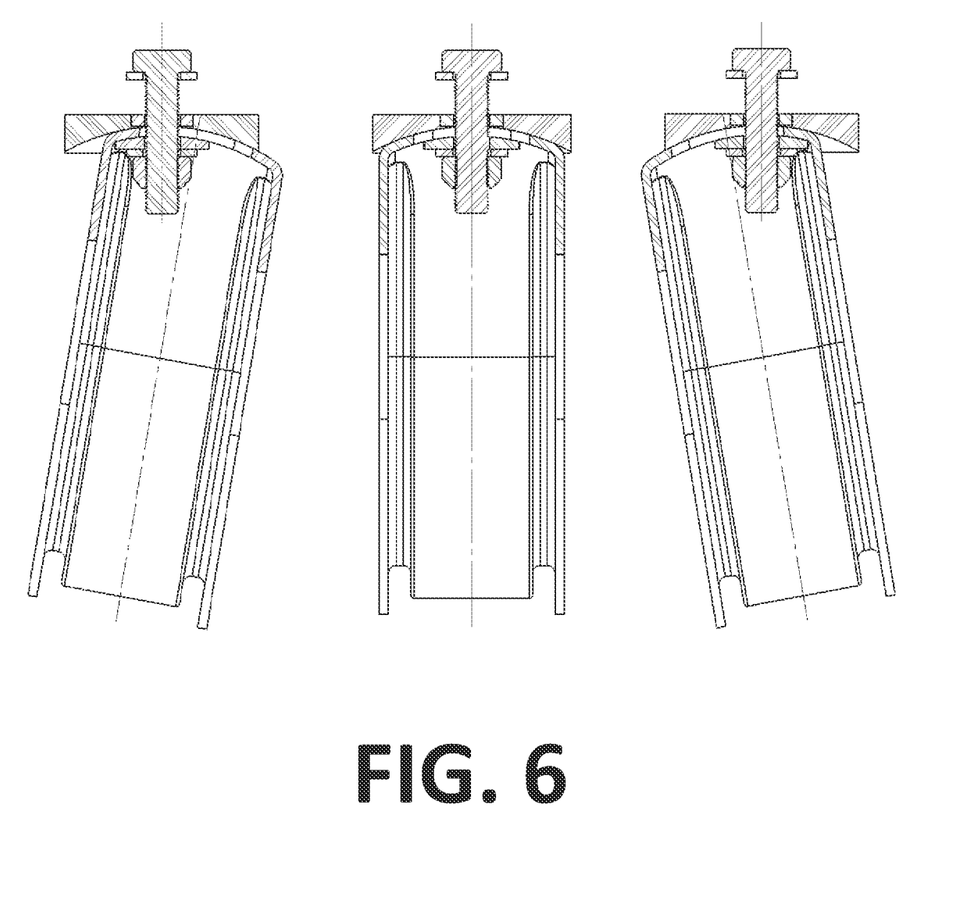
FIG. 6 illustrates the adjustable anti-vibration rubber assembly for a cardan shaft as pre-assembled on the vehicle's support (9), displaying the angles that can be obtained before the final installation adjustment torque is applied, according to another embodiment of the invention.

FIG. 5 and FIG. 6 illustrate the range of adjustment angles obtained by the configuration of the radial base system (4), ensuring perpendicularity from the installation with the cardan shaft. This, in turn, reduces the excess deformation stress due to the load generated by the cardan shaft.

Figure 7:
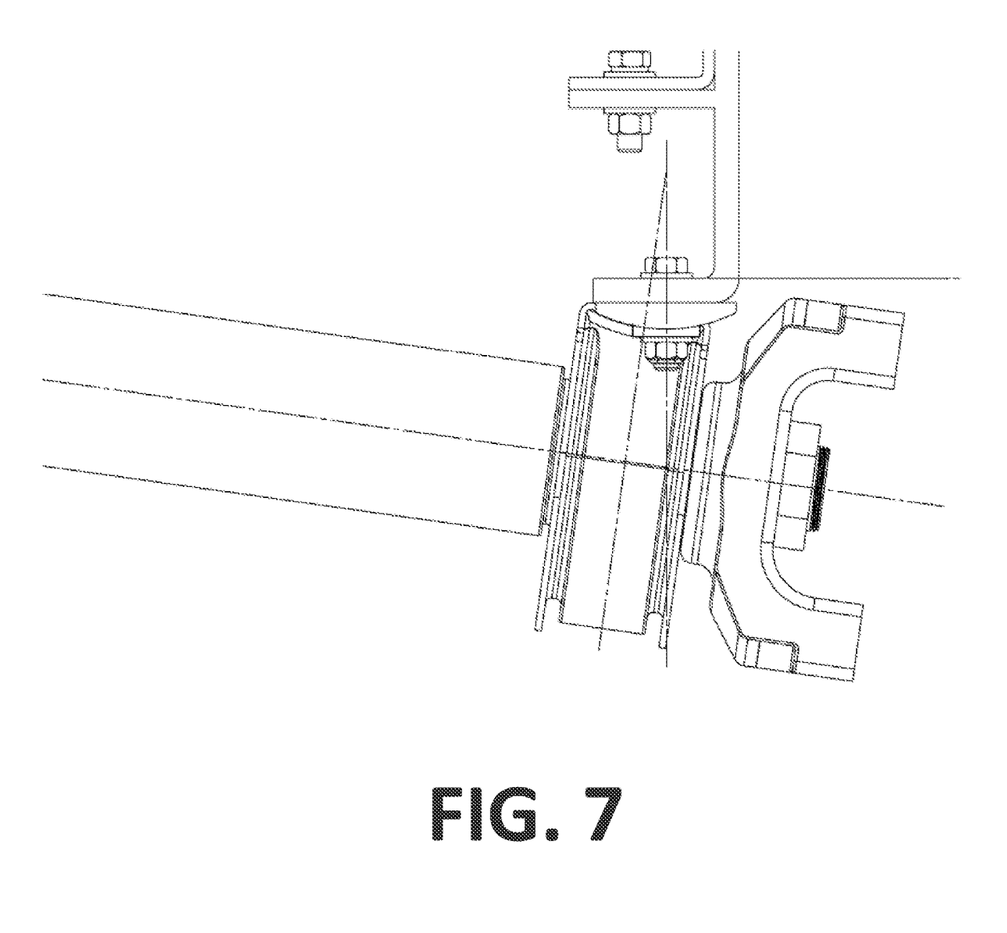
FIG. 7 illustrates the coupling of the complete cardan shaft, which includes the adjustable anti-vibration rubber assembly for a cardan shaft on the cardan shaft (10) and the yoke (11) that complements the corresponding working angle.

Finally, FIG. 7 illustrates the connections and adjustments among the components of the cardan shaft assembly (10) of FIG. 1 which ensure no interference with the operational movements of the complete assembly. The same arrangement of connections and adjustments are provided for the cardan shaft assembly (10) of FIG. 2 which also ensure no interference with the operational movements of the complete assembly.

The radial base (4) is preferably made from a rigid polymer that provides resistance to friction and withstands the torque necessary when assembling this radial base (4) to the metal tightening plate (5), which protect the shape of the base of the metal frame (3). Its design consists of a radius of action and a detent tab (4.1) that ensures the necessary alignment for assembly with the vehicle while preventing lateral movements.

The assembly of the present invention reduces excessive work in the flexible rubber bearing support (1), ensuring the proper alignment of the bearing (2), without deforming the flexible rubber bearing support (1) from the installation as can be appreciated in FIG. 4.

The installation process of the adjustable anti-vibration rubber assembly for the cardan shaft of the present invention is similar to the installation process of previous supports, where the yoke (11) is uninstalled allowing the disassembly of the cardan shaft (10) and removing the anti-vibration rubber assembly for the cardan shaft to be replaced. Next, the cardan shaft is installed within the inner diameter of the bearing (2) of the adjustable anti-vibration rubber assembly for the cardan shaft to be installed and the assembly is moved towards the installation surface of the support (9). As a preliminary securing measure, the installation screws (6) with the washer (7) and the nut (8) are initially adjusted, positioning the tightening plates (5) in a coupling arrangement with the adjustable anti-vibration rubber assembly for the cardan shaft and the radial bases (4), without applying the required adjusting torque.

Subsequently, the previously removed yoke (11) is installed using its corresponding torque. The final installation of the cardan shaft (10) is carried out by aligning the adjustable anti-vibration rubber assembly for the cardan shaft perpendicularly with the cardan shaft, adjusting the assembly until obtaining the necessary working angle, and adjusting the adjustable anti-vibration rubber assembly for the cardan shaft on the installation surface of the support (9) with the necessary adjusting torque to achieve a working position as shown in FIG. 4.

According to a preferred embodiment of the invention, an adjustable anti-vibration rubber assembly for the cardan shaft (100) that supports a cardan shaft (10) at variable angles relative to the surface of a support (9) comprises a bearing (2) and a flexible rubber bearing support (1) that supports the bearing (2). The flexible rubber bearing support (1) has a curved outer surface. A metal frame (3) is provided to enclose the flexible rubber bearing support (1). The metal frame (3) has a curved inner surface that matches the curved outer surface of the flexible rubber bearing support (1) to securely hold the assembly of the flexible rubber bearing support to the metal frame (3). In a preferred embodiment, the metal frame (3) has upper ends provided with a concave surface that mates with respective convex surfaces provided on a radial base (4), allowing angular sliding movement of the metal frame (3) with respect to the surface of the support (9). Alternatively, the metal frame (3) has upper ends provided with a convex surface that mates with respective concave surfaces provided on a radial base (4).

Finally, the variable angular attachment of the adjustable assembly of the metal frame (3) including the flexible rubber bearing support (1) and the bearing (2) is achieved by using the installation screws (6), a washer (7), and a nut (8) along with a tightening plate (5) provided with a concave face.

The upper ends of the metal frame (3), the radial bases (4) and the tightening plates (5) have passthrough openings, where the passthrough openings of the upper ends of the metal frame (3) are bigger than the passthrough openings of the radial bases (4) and the tightening plates (5). According to a preferred embodiment of the invention the passthrough openings of the upper ends of the metal frame (3) have an elongated shape and the passthrough openings of the radial bases (4) and the tightening plates (5) have a circular shape, as shown in FIG. 1. However, other shapes can be used as long as rotation between the metal frame (3) and the radial bases (4) is permitted in accordance to the teachings of the invention.

According to another aspect of the invention, the adjustable anti-vibration rubber assembly is provided as a kit. Specifically, the kit includes at least the metal frame (3), the radial bases (4) and the tightening plates (5) but can also include at least one of the flexible rubber bearing support (1), the bearing (2) or the necessary installation screws (6), washers (7), and nuts (8) to install the adjustable anti-vibration rubber assembly on a vehicle chassis. In addition, the metal frame (3) of the kit can be provided with or without the flexible rubber bearing support (1) and the bearing (2) which can be replaced or interchanged with other flexible rubber bearing support (1) and bearing (2). The components of the kit are selected at least from the components shown individually in the exploded views of FIG. 1 and FIG. 2.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. An adjustable anti-vibration rubber assembly for a cardan shaft, said assembly comprising:
 a frame enclosing a bearing support containing a bearing, wherein said frame includes upper ends having a curved surface; and
 radial bases having a curve surface adapted to mate with the curved surface of said upper ends and a flat surface opposite to said curved surface of the radial bases adapted to couple said radial bases with a flat surface of a chassis.

2. The adjustable anti-vibration rubber assembly according to claim 1, wherein the curved surface of said upper ends is concave and the curved surface of said radial bases is convex.

3. The adjustable anti-vibration rubber assembly according to claim 1, wherein the curved surface of said upper ends is convex and the curved surface of said radial bases is concave.

4. The adjustable anti-vibration rubber assembly according to claim 1, wherein the curved surface of said upper ends has a passthrough opening and the curved surface of said radial bases has a passthrough opening smaller than the passthrough opening of said upper ends.

5. The adjustable anti-vibration rubber assembly according to claim 1, wherein the curved surface of said upper ends has an elongated passthrough opening and the curved surface of said radial bases has a circular passthrough opening.

6. The adjustable anti-vibration rubber assembly according to claim 1, wherein said radial bases further comprise a detent tab protruding from the radial bases to align the frame and prevent lateral movement of said frame.

7. The adjustable anti-vibration rubber assembly according to claim 1, further comprising tightening plates having a surface adapted to mate with a surface opposite to the curved surface of said upper ends.

8. The adjustable anti-vibration rubber assembly according to claim 7, wherein the surface of said tightening plates is curved.

9. The adjustable anti-vibration rubber assembly according to claim 1, wherein the metal frame rotates at an angular range of ±11° in relation to said chassis.

10. A kit for an adjustable anti-vibration rubber assembly for a cardan shaft, said kit comprising:
 a frame configured to enclose a bearing support for a cardan shaft, wherein said frame includes upper ends having a curved surface;
 radial bases having a curve surface adapted to mate with the curved surface of said upper ends and a flat surface opposite to said curved surface of the radial bases adapted to couple said radial bases with a flat surface of a chassis; and
 tightening plates having a surface adapted to mate with a surface opposite to the curved surface of said upper ends.

11. The kit according to claim 10, further comprising at least one screw, one washer and one nut.

12. The kit according to claim 10, wherein the curved surface of said upper ends is concave and the curved surface of said radial bases is convex.

13. The kit according to claim 10, wherein the curved surface of said upper ends is convex and the curved surface of said radial bases is concave.

14. The kit according to claim 10, wherein the curved surface of said upper ends has a passthrough opening and the curved surface of said radial bases has a passthrough opening smaller than the passthrough opening of said upper ends.

15. The kit according to claim 10, wherein the curved surface of said upper ends has an elongated passthrough opening and the curved surface of said radial bases has a circular passthrough opening.

16. The kit according to claim 10, wherein said radial bases further comprise a detent tab protruding from the radial bases to align the frame and prevent lateral movement of said frame.

17. The kit according to claim 10, further comprising tightening plates having a surface adapted to mate with a surface opposite to the curved surface of said upper ends.

18. The kit according to claim 17, wherein the surface of said tightening plates is curved.

19. The kit according to claim 10, wherein the surface opposite to the curved surface of said upper ends is curved.

20. The kit according to claim 10, wherein the metal frame rotates at an angular range of ±11° in relation to said chassis.

* * * * *